United States Patent [19]

Berding et al.

[11] Patent Number: 4,878,519

[45] Date of Patent: Nov. 7, 1989

[54] PISTON ACCUMULATOR

[75] Inventors: Josef Berding, Ludwigsburg; Hannes Bertling, Vaihingen; Thomas Lees, Ludwigsburg; Carsten Pabst, Stuttgart, all of Fed. Rep. of Germany

[73] Assignee: Robert Bosch GmbH, Stuttgart, Fed. Rep. of Germany

[21] Appl. No.: 243,025

[22] PCT Filed: Jan. 7, 1988

[86] PCT No.: PCT/DE88/00008
§ 371 Date: Aug. 11, 1988
§ 102(e) Date: Aug. 11, 1988

[87] PCT Pub. No.: WO88/05134
PCT Pub. Date: Jul. 14, 1988

[30] Foreign Application Priority Data

Jan. 10, 1987 [DE] Fed. Rep. of Germany ....... 3700576

[51] Int. Cl.⁴ ............................................. P16L 55/04
[52] U.S. Cl. .......................................... 138/31; 277/3
[58] Field of Search ................... 138/31; 92/182, 193, 92/94; 417/540; 277/3

[56] References Cited

U.S. PATENT DOCUMENTS

| 2,673,527 | 3/1954 | Ashton et al. | 138/31 |
| 2,817,361 | 12/1957 | Mercier | 138/31 |
| 3,015,345 | 1/1962 | Michael | 138/31 |
| 4,674,541 | 6/1987 | Fulmer | 138/31 |
| 4,685,491 | 8/1987 | Fulmer et al. | 138/31 |
| 4,693,276 | 9/1987 | Fulmer | 138/31 |

Primary Examiner—James E. Bryant, Jr.
Attorney, Agent, or Firm—Michael J. Striker

[57] ABSTRACT

An accumulator comprises a cylinder formed with a substantially closed chamber and a piston formed with a small-diameter central region and a pair of large-diameter end regions flanking the central region and each formed with an outwardly open annular groove. This piston subdivides the chamber into a gas compartment at one of the end regions, a liquid compartment at the other end region, and an annular charging compartment surrounding the central region. The piston is displaceable in the cylinder to oppositely vary the volumes of the gas and liquid compartments. Respective gas and liquid seals are engaged in the grooves between the gas- and liquid-compartment end regions of the piston and the cylinder and are both constructed to inhibit fluid flow from the respective gas and liquid compartments into the charging compartment. The liquid seal is also constructed to inhibit fluid flow from the charging compartment into the liquid compartment but the gas seal is constructed to permit fluid flow from the charging compartment past itself into the gas compartment. A passage is formed in the cylinder opening directly into the charging compartment for introducing a gas under pressure into same and for thereby pressurizing the charging and gas compartments by flowing the gas past the gas seal into the gas compartment.

5 Claims, 2 Drawing Sheets

4,878,519

PISTON ACCUMULATOR

SPECIFICATION

Field of the Invention

The present invention relates to a pressure accumulator. More particularly this invention concerns a gas-charged piston-type accumulator used to maintain pressure in a hydraulic system.

BACKGROUND OF THE INVENTION

A standard piston-type pressure accumulator has a cylinder forming a chamber that is subdivided into a gas compartment and a liquid compartment by a piston which is movable to increase the volume of one of the compartments while decreasing that of the other and vice versa. The gas compartment is filled with a gas under pressure, usually compressed air, and the liquid compartment is connected to the hydraulic system whose pressure is to be maintained.

Normally a passage provided with a check valve opens directly into the gas compartment and serves for charging same. A screw connection permits the charging equipment to be connected to this passage. Such construction is fairly complex and therefore elevates the cost of the accumulator.

OBJECTS OF THE INVENTION

It is therefore an object of the present invention to provide an improved accumulator.

Another object is the provision of such an improved accumulator which overcomes the above-given disadvantages, that is which is of simple and inexpensive construction.

SUMMARY OF THE INVENTION

These objects are attained according to the invention in an accumulator comprising a cylinder formed with a substantially closed chamber and a piston formed with a small-diameter central region and a pair of large-diameter end regions flanking the central region and each formed with an outwardly open annular groove. This piston subdivides the chamber into a gas compartment at one of the end regions, a liquid compartment at the other end region, and an annular charging compartment surrounding the central region. The piston is displaceable in the cylinder to oppositely vary the volumes of the gas and liquid compartments. Respective gas and liquid seals are engaged in the grooves between the gas- and liquid-compartment end regions of the piston and the cylinder and are both constructed to inhibit fluid flow from the respective gas and liquid compartments into the charging compartment. According to this invention the liquid seal is also constructed to inhibit fluid flow from the charging compartment into the liquid compartment but the gas seal is constructed to permit fluid flow from the charging compartment past itself into the gas compartment. A passage is formed in the cylinder opening directly into the charging compartment for introducing a gas under pressure into same and for thereby pressurizing the charging and gas compartments by flowing the gas past the gas seal into the gas compartment.

DESCRIPTION OF THE DRAWING

The above and other objects, features, and advantages will become more readily apparent from the following, reference being made to the drawing in which.

DESCRIPTION OF THE EMBODIMENT EXAMPLE

Figure 1:
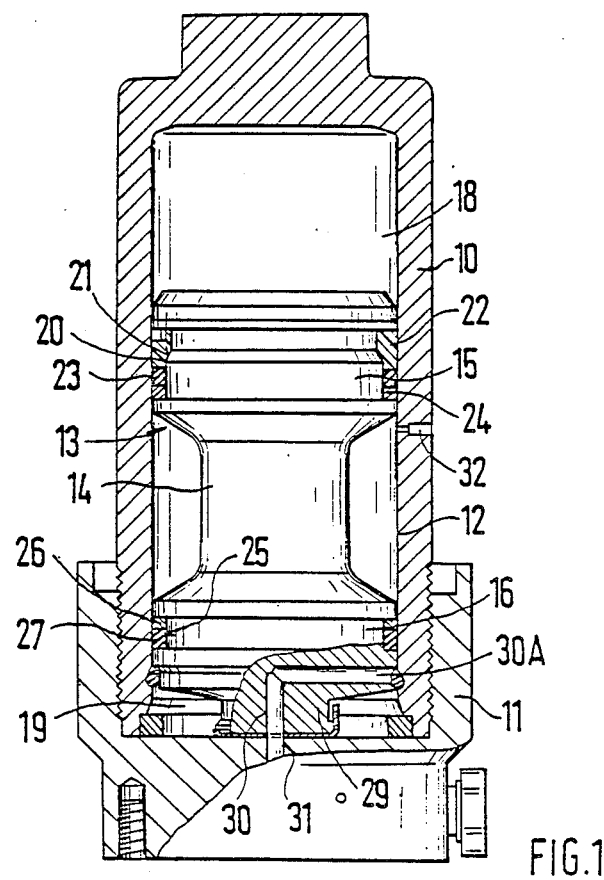
FIG. 1 is a longitudinal section through a piston accumulator.

The housing of a piston accumulator, which housing is constructed so as to be approximately cylindrical and hollow, is designated by 10 in FIG. 1; its opening is closed by means of a cover 11. A piston 13 is guided in the cylindrical bore hole 12 of the housing 10 so as to slide in a tight manner. It has a central necked-down portion 14, so that collars 15 and 16, which have a slight play, result at both sides of same. The piston 13 separates a gas space 18 from a liquid space 19. At the collar 15 of the piston 13, an elongate annular groove 20 is constructed which comprises a portion 21 which is partially conically reduced toward the gas space. Three annular elements, namely a profile ring 22 facing the gas space, a subsequent O-ring 23, and a supporting ring 24, which is arranged downstream of the latter and comprises an approximately rectangular cross section, are arranged in this annular groove.

At the collar 16, a seal arrangement is likewise located in an annular groove 25, the seal arrangement comprising an O-ring 27 facing the liquid space 19 and a seal ring 26 which has an approximately rectangular cross section and is arranged upstream of the O-ring 27. A connecting piece 29 is formed on at this side at the free end of the collar 16. This connecting piece 29 and the lower part of the collar 16 are penetrated by a duct 30 which communicates with a continuous bore hole 31 in the cover 11 on the one hand and opens into a duct portion 30A at the external circumference of the collar on the other hand.

A bore hole 32, which penetrates the wall of the housing 10, is constructed approximately in the center of the latter. This bore hole 32 opens into the region in which the necked-down portion 14 is located at least when the piston 13 is located in a position in which the liquid space 19 is emptied.

Figure 2:
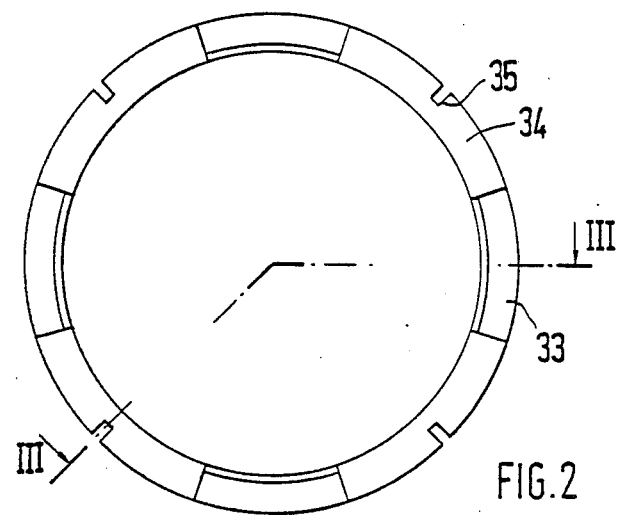
FIG. 2 shows a top view of a sealing ring.
Figure 3:
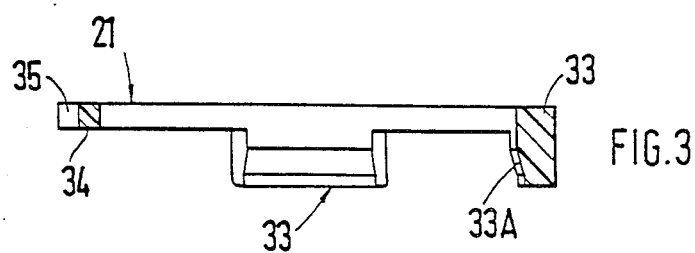
FIG. 3 shows a section along III—III according to FIG. 2.

The profile ring 22 is shown in more detail in FIGS. 2 and 3. It comprises an external flange 33 having an approximately rectangular cross section and an inner bevel 33A. The flange 33 is repeatedly interrupted by means of flat recesses 34, a short radial notch 35 being located at each of these recesses 34. The profile ring 22 is arranged in the annular groove 20 in such a way that its conical portion 21 and the bevel 33A lie opposite one another. The supporting ring 24 prevents the gap extrusion of the O-ring 23.

Before the piston accumulator is put into operation, it must be charged with gas. This is effected via the bore hole 32. The pressure propogates and penetrates to the O-ring 23 via the play between the collar 15 and the bore hole 12 and via the supporting ring 24, which O-ring 23 is now partially pressed into the recesses 34 of the profile ring 22. Accordingly, the O-ring 23 also arrives partly at the conical portion 21 and is constricted there by means of its inherent tension, so that a connection is produced at its external circumference to the gas space 18 via the external collar 15, i.e. the compressed gas penetrates into the gas space 18 along the collar and the seal arrangement. If the pressure prevailing in the gas space 18 is the same as that in the compressed gas source, pressure equilibrium prevails in the region 14 and in the gas space 18. Due to its elasticity and the particular groove shape (diagonal portion 21), the O-ring 23 then arrives in its previously assumed rest position, i.e. at the cylindrical part of the annular groove 20, whereupon it seals the gas space. The piston accumulator is now ready for operation. The bore hole 31 in the cover 11 is connected to a hydraulic system so that liquid pressure medium can penetrate into the liquid space 19 via the bore hole 31 and the duct 30A when the presence of the liquid pressure medium is greater than the gas pressure.

The seal arrangements at the collars 15 and 16 ensure a good sealing between the gas space and the liquid space. The gas space 18 can easily be recharged—if required—after a determined operating period via the bore hole 32. The latter is advisably arranged in such a way that there is a connection to the necked-down portion 14 in both end positions of the piston 13.

Figure 4:
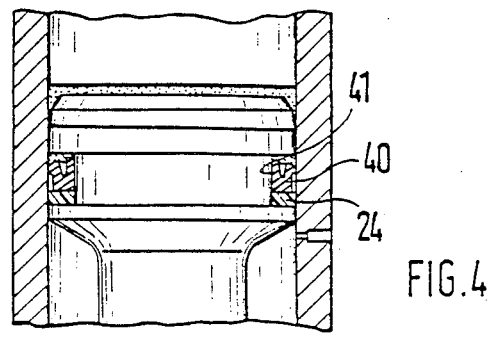
FIG. 4 shows a partial section of another embodiment example.

The seal arrangement consisting of seal rings 21 to 23 can, of course, be modified and can consist of a lip seal ring 40, for example, which replaces the profile ring 22. Such a construction is shown in FIG. 4. The annular groove 41 now has a rectangular profile.

What is claimed is:

1. An accumulator comprising:
    a cylinder formed with a substantially closed chamber;
    a piston formed with a small-diameter central region and a pair of large-diameter end regions flanking the central region and each formed with an outwardly open annular groove, the piston subdividing the chamber into a gas compartment at one of the end regions, a liquid compartment at the other end region, and an annular charging compartment surrounding the central region, the piston being displaceable in the cylinder to oppositely vary the volumes of the gas and liquid compartments, the liquid compartment being adapted for connection to a hydraulic system;
    respective gas and liquid seals engaged in the grooves between the gas- and liquid-compartment end regions of the piston and the cylinder and both constructed to inhibit fluid flow from the respective gas and liquid compartments into the charging compartment, the liquid seal also being constructed to inhibit fluid flow from the charging compartment into the liquid compartment but the gas seal being constructed to permit fluid flow from the charging compartment past itself into the gas compartment; and
    means including a passage formed in the cylinder and opening directly into the charging compartment for introducing a gas under pressure into same and for thereby pressurizing the charging and gas compartments by flowing past the gas seal into the gas compartment.

2. The accumulator defined in claim 1 wherein the groove of the gas-compartment end region has a conical surface tapered toward the gas compartment.

3. The accumulator defined in claim 2 wherein the gas-compartment seal includes an O-ring and a holding ring between the O-ring and the gas compartment and formed with at least one cavity level with the conical surface and open toward the O-ring.

4. The accumulator defined in claim 1 wherein the gas-compartment seal is of U-section open toward the gas compartment.

5. The accumulator defined in claim 1 wherein the piston is movable through a predetermined stroke between end positions, the annular charging compartment being longer than the stroke and the fill passage opening generally centrally into the charging compartment.

* * * * *